(12) United States Patent
Chu et al.

(10) Patent No.: US 7,778,132 B2
(45) Date of Patent: Aug. 17, 2010

(54) SYSTEM AND METHOD FOR OPTIMIZING WRITE STRATEGY PARAMETERS USING TWO-STAGE ADJUSTMENT

(75) Inventors: Chih-Hsiung Chu, Hsinchu County (TW); Chih-Ching Yu, Tao-Yuan Hsien (TW)

(73) Assignee: Mediatek Inc., Hsin-Chu (TW)

( * ) Notice: Subject to any disclaimer, the term of this patent is extended or adjusted under 35 U.S.C. 154(b) by 985 days.

(21) Appl. No.: 11/424,552

(22) Filed: Jun. 16, 2006

(65) Prior Publication Data
US 2007/0047414 A1 Mar. 1, 2007

Related U.S. Application Data

(60) Provisional application No. 60/713,097, filed on Aug. 31, 2005.

(51) Int. Cl.
G11B 7/00 (2006.01)
(52) U.S. Cl. .................. 369/59.11; 369/59.12
(58) Field of Classification Search ............... 369/59.11
See application file for complete search history.

(56) References Cited

U.S. PATENT DOCUMENTS

| 5,732,062 | A  | * | 3/1998  | Yokoi et al. ............. 369/116 |
| 6,411,579 | B2 | * | 6/2002  | Nobukuni et al. ........ 369/59.12 |
| 6,791,926 | B1 |   | 9/2004  | Furumiya et al. |
| 6,912,188 | B2 |   | 6/2005  | Morishima |
| 7,006,420 | B1 | * | 2/2006  | Hsu et al. ................ 369/59.12 |
| 7,158,460 | B2 |   | 1/2007  | Ogawa |
| 7,474,601 | B2 | * | 1/2009  | Shirota et al. ............. 369/59.1 |
| 2003/0151994 | A1 |   | 8/2003  | Tasaka et al. |
| 2004/0130993 | A1 |   | 7/2004  | Nadershahi |
| 2004/0160873 | A1 |   | 8/2004  | Pereira |
| 2004/0160874 | A1 |   | 8/2004  | Hwang et al. |
| 2006/0262692 | A1 | * | 11/2006 | Yu et al. .................. 369/59.11 |

FOREIGN PATENT DOCUMENTS

| CN | 1405758 | 3/2003 |
| TW | 457476 B | 10/2001 |

OTHER PUBLICATIONS

CN Office Action mailed Sep. 28, 2007.
English language abstract TW457476 (published Oct. 1, 2001).

* cited by examiner

Primary Examiner—Van N Chow
(74) Attorney, Agent, or Firm—Thomas, Kayden, Horstemeyer & Risley

(57) ABSTRACT

A method for optimizing write parameters using two-stage adjustment is provided. A first kind of write strategy parameters optimization procedure for adjusting at least one static write strategy parameter of a write strategy is performed. A second kind of write strategy parameters optimization procedure for adjusting at least one dynamic write strategy parameter of the write strategy is performed after performing the first kind of write strategy parameters optimization procedure. The static write strategy parameter corresponds to a signal length of a pit on an optical disk and the dynamic write strategy parameter is utilized to overcome heat interference when forming the pit.

22 Claims, 15 Drawing Sheets

SYSTEM AND METHOD FOR OPTIMIZING WRITE STRATEGY PARAMETERS USING TWO-STAGE ADJUSTMENT

BACKGROUND

The invention relates to optical disk recording, and more particularly, to systems and methods for optimizing write strategy parameters using two-stage adjustment.

In order to precisely reproduce the data signals, the laser power control pulse, such as the pulse width, pulse shape and power level of laser output, are must be precisely controlled to record stable and accurate marks on an optical disk. The laser power level is typically acquired by an optimal power calibration (OPC) procedure. Optimal write parameters for the width and shape of laser output are typically achieved by repeatedly adjusting so-called write strategies.

Before an optical disk recorder leaving a factory, the manufacturer would setup a plurality of optimum write strategies for various optical disks, and store the optimum write strategies individually with a disk identity in a built-in table embedded in the optical disk recorder. When recording data, the optical disk recorder reads a corresponding write strategy from the built-in table according to a disk identity of a loaded optical disk and performs the conventional OPC procedure to acquire an optimal write power level. The conventional method has several drawbacks. First, there always has manufacturing difference between the optical disks or the optical disk recorders, so the optimal write strategy for recording the marks may be diverged from the best setting. Even the optimal power level has determined by the OPC procedure, the marks may not be recorded well and the recording quality maybe unreliable, due to the variations of the optical disks or optical disk recorders. Second, the optical disk recorders may consume excessive storage space to support all possible optical disk types. And this will also need a large number of human powers to adjust the optimal write strategies for the all possible optical disk types. Large storage space and large number of human powers will also cost a lot. Moreover, there always have new types of optical disks being manufactured. Due to the limited storage space and limited human power, the optical disk recorder can not support all optical disk types. Then, the optical disk recorder is restricted in practicability.

In order to determine optimum write strategy for unsupported optical disks, conventional methods may first perform several trial recordings using different write strategies and subsequently determine a better write strategy therefrom according to several write quality indices.

SUMMARY

Methods for optimizing write parameters using two-stage adjustment are provided. An embodiment of a method for optimizing write parameters using two-stage adjustment comprises the following steps. A static write strategy parameter optimization procedure for adjusting at least one static write strategy parameter of a write strategy is performed. A dynamic write strategy parameter optimization procedure for adjusting at least one dynamic write strategy parameter of the write strategy is performed after performing the static write strategy parameter optimization procedure.

Systems for optimizing write parameters using two-stage adjustment are provided. An embodiment of a system comprises a write parameter adjustment controller. The write parameter adjustment controller performs a static write strategy parameter optimization procedure for adjusting at least one static write strategy parameter of a write strategy and performs a dynamic write strategy parameter optimization procedure for adjusting at least one dynamic write strategy parameter of the write strategy after performing the static write strategy parameter optimization procedure.

The static write strategy parameter corresponds to a signal length of a pit on an optical disk and the dynamic write strategy parameter is utilized to overcome heat interference for forming the pit.

BRIEF DESCRIPTION OF THE DRAWINGS

The invention will become more fully understood by referring to the following detailed description of embodiments with reference to the accompanying drawings, wherein.

DESCRIPTION

Figure 1A:
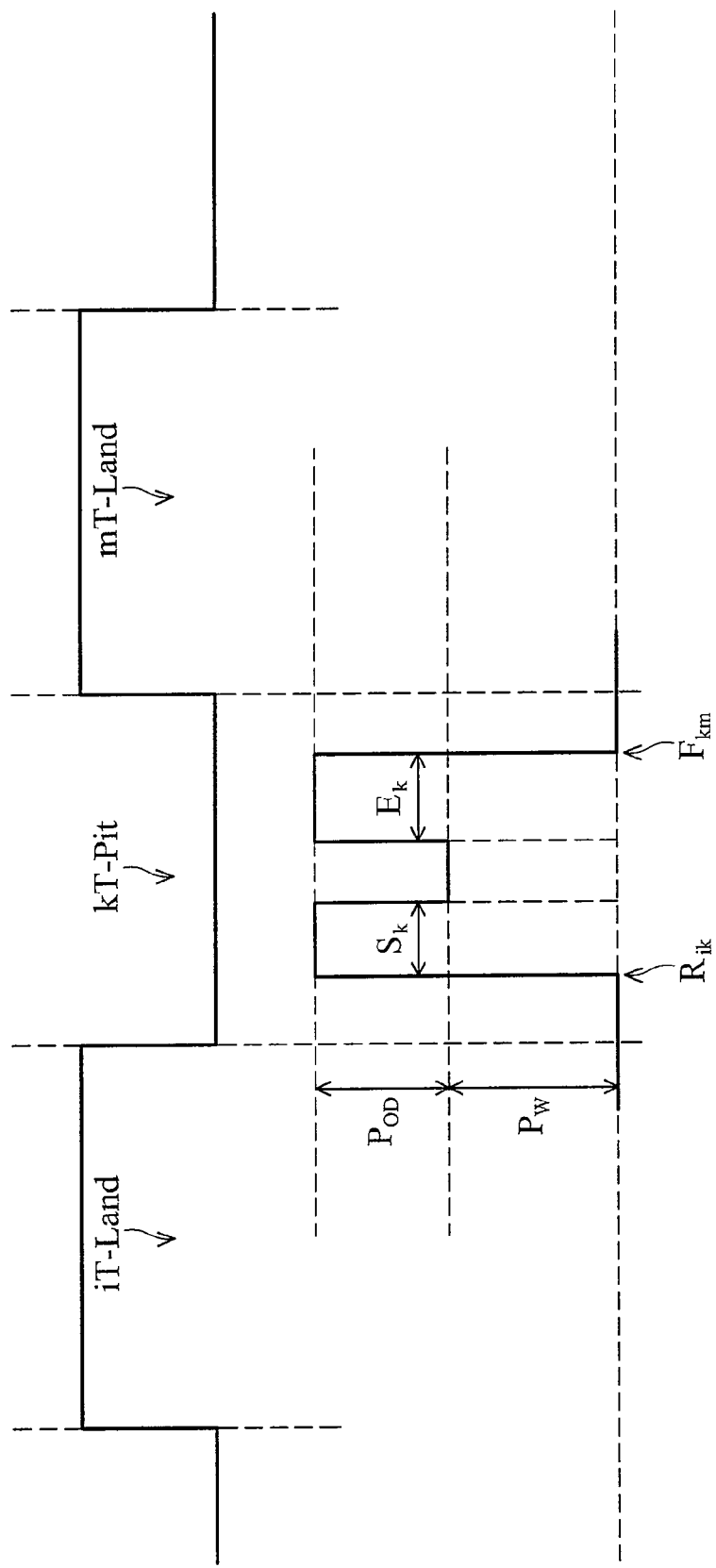
FIG. 1a is a diagram of an exemplary "castle-type" laser output.
Figure 1B:
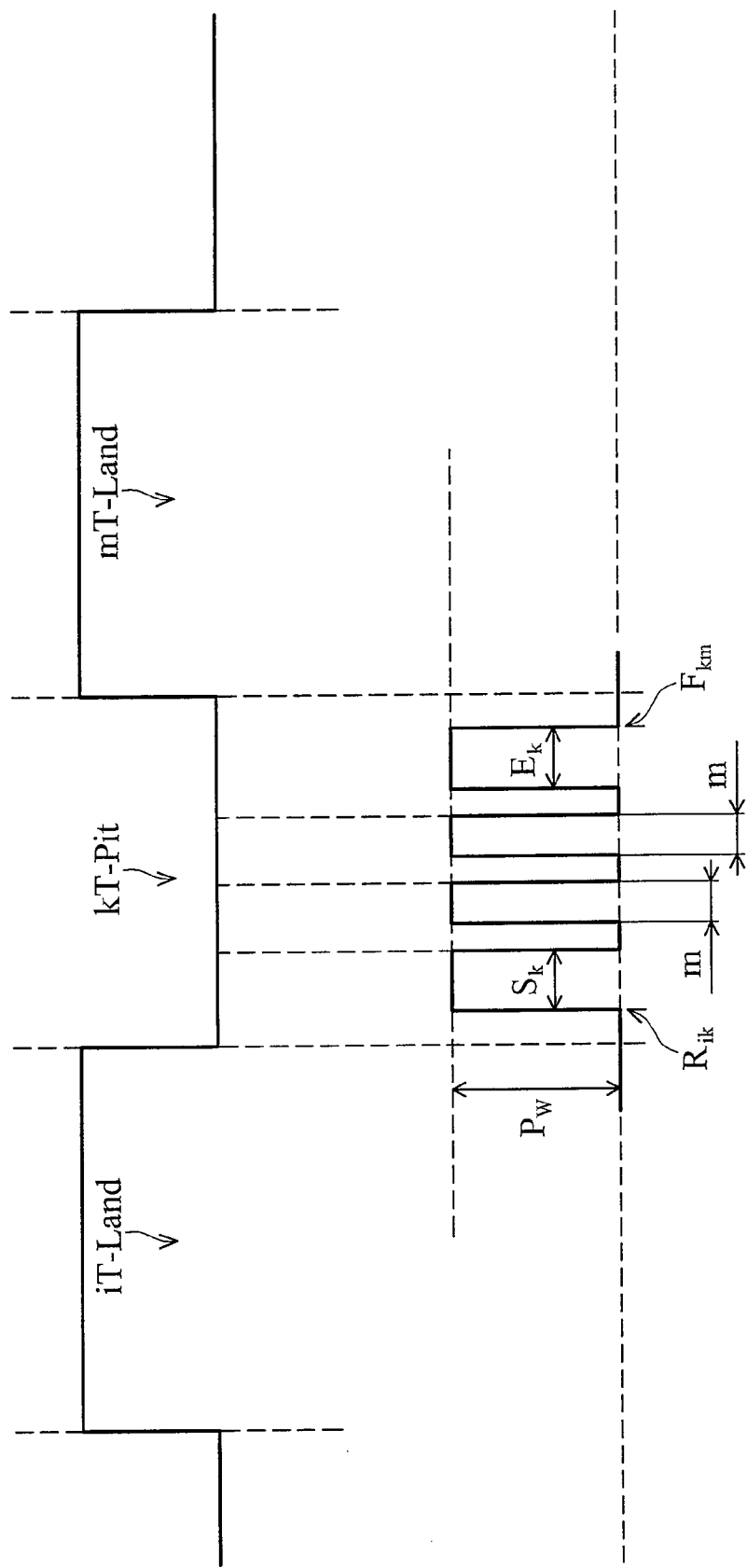
FIG. 1b is a diagram of an exemplary "multi-pulse" laser output.

The present invention could be adopted for optimizing two kinds of write strategies. FIGS. 1a and 1b are diagrams of exemplary write strategies for recording pits, respectively an exemplary. "castle type" write strategy and an exemplary "multipulse type" write strategy. Referring to FIG. 1a, $P_W$ represents laser power level, over drive (OD) represents over-drive power percentage for short marks, $S_k$ and $E_k$ respectively represent OD power width of the front end of the short marks and OD power width of the back end of the short marks. Short marks may contain 3T to 5T marks. In this embodiment, write strategy parameters $P_W$, OD, $S_k$ and $E_k$ are referred to as static write strategy parameters. The static write strategy parameters associates with whether marks are formed and their formation quality. Besides, dynamic write strategy parameters include $R_{ik}$ and $F_{km}$, where ik and km represent combinations of previous (i) and following (m) T-length marks, the T-lengths are as 3T to 6T or greater. It means that the dynamic write strategy parameters are affected by combinations of previous and following T-length marks. By adjusting $R_{ik}$ and $F_{km}$, the heat interference between the adjacent marks is overcome to form more precise marks. Referring to FIG. 1b, in multipulse write strategy, $P_W$ represents laser power level, $S_k$ and $E_k$ respectively represent widths of a start pulse and an end pulse, m represents a ratio of width of one middle pulse to base clock T. $P_W$, m, $S_k$ and $E_k$ are referred to as static write strategy parameters and $R_{ik}$ and $F_{km}$ are referred to as dynamic write strategy parameters.

Figure 2:
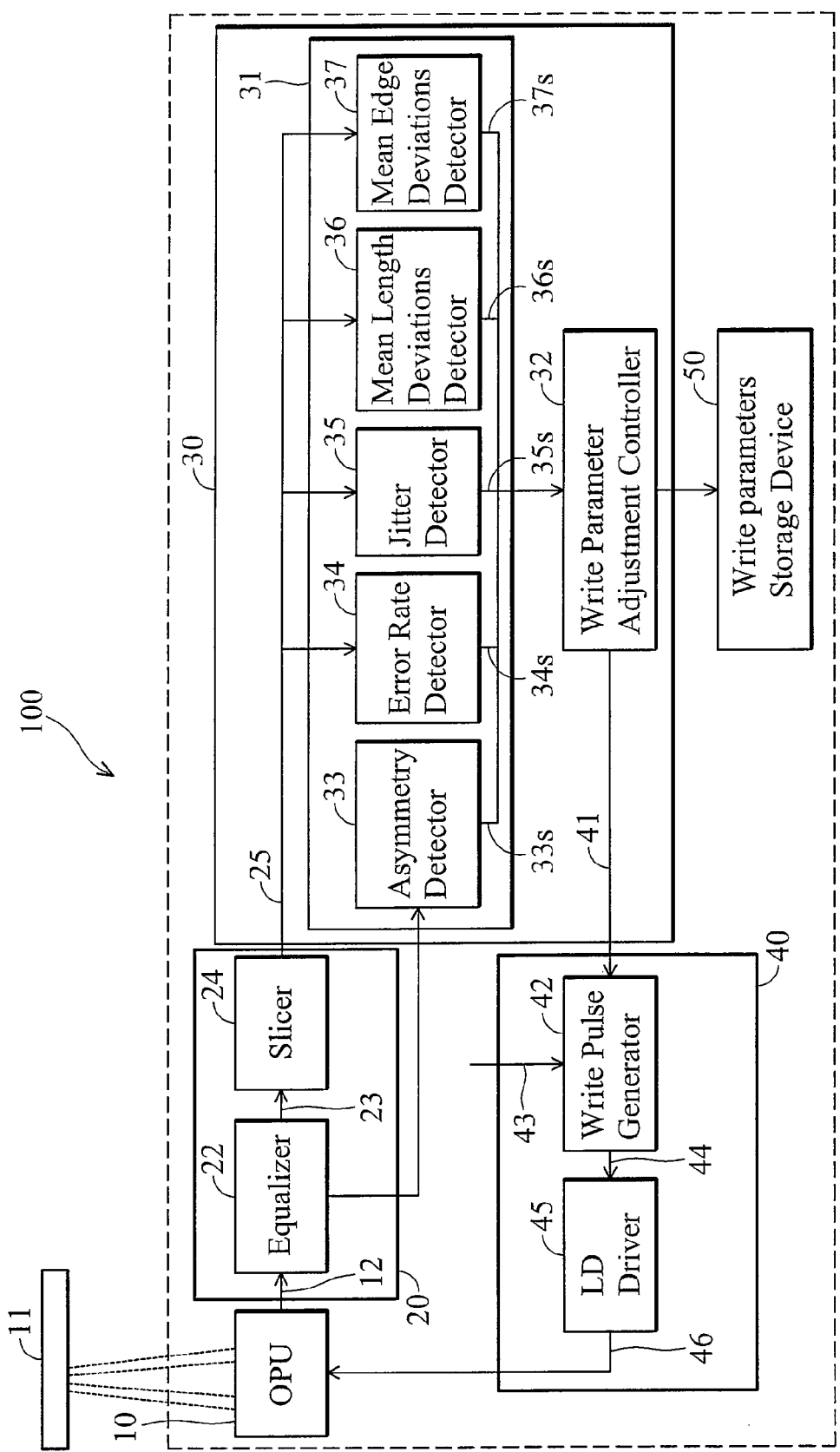
FIG. 2 is a diagram of a hardware environment applicable to an embodiment of a system for optimizing write parameters.

FIG. 2 is a diagram of a hardware environment applicable to an embodiment of a system for optimizing write strategy parameters. An embodiment of an optical disk recorder 100 comprises an optical pick-up (OPU) 10, a signal read unit 20, a write parameter adjustment unit 30 and a mark write unit 40. The signal read unit 20 comprises a waveform equalizer 22 and slicer 24, being part of well-known read channel of optical disk recorder 100. The OPU 10 reads data marks from an optical disk 11 and generates radio frequency (RF) signals 12. The waveform equalizer 22 rebuilds RF signals 12 to equalized signals 23. The equalized signals 23, are divided into sliced signals 25 by the slicer 24. The equalized signals 23 and sliced signals 25 are input signals of the write parameter adjustment unit 30.

Write parameter adjustment unit 30 comprises two devices: a write quality detection unit 31 and a write parameter adjustment controller 32. The write quality detection unit 31 comprises an asymmetry detector 33, an error rate detector 34, a jitter detector 35, a length deviations detector 36 and an edge deviations detector 37. The equalized signals 23 are input to the asymmetry detector 33. The sliced signals 25 are input to the error rate detector 34, jitter detector 35, length deviations detector 36 and edge deviations detector 37. After calculating the input signals, the asymmetry detector 33 outputs an asymmetry of RF signal 33s (also called β value), the error rate detector 34 outputs the data error rates 34s, the jitter detector 35 outputs a jitter magnitudes 35s, the length deviations detector 36 outputs a mean length deviations for all mark combinations 36s, and the edge deviations detector 37 outputs a mean edge shifts for all mark combinations 37s.

RF signal asymmetry 33s (also called β value), data error rates 34s, jitter magnitudes 35s, mean length deviations for all mark combinations 36s, and mean edge shifts for all mark combinations 37s are selectively input to the write parameter adjustment controller 32 according to operations in write parameter adjustment processes. For example, when determining whether write quality is acceptable, the data rates 34s and jitter magnitudes 35s are input to the write parameter adjustment controller 32 as input signals. When adjusting dynamic write strategy parameters, mean length deviations for all mark combinations 36s, and mean edge shifts for all mark combinations 37s are input to the write parameter adjustment controller 32 as input signals. Note that although the present invention adopts one or more combinations of the above input signals, it is unnecessary to reference all input signals during write parameters optimization. Furthermore, those skilled may adopt different but similar input signals representing write quality to perform write parameter adjustment. Output signals of the write parameter adjustment controller 32 are write pulse control signals 41 controlling shape of write pulse, and write strategy parameters 38. The write strategy parameters 38 are further stored in the write parameters storage unit 50.

The write parameter adjustment controller 32, in normal write strategy parameter adjustment, sets certain candidate write strategy parameters and acquires the best settings of write strategy parameters by a series of previous test writes. The write parameter adjustment controller 32, in dynamic write strategy parameter adjustment, calculates corrections for dynamic write strategy parameters according to physically measured mean length deviations and mean edge shifts for all mark combinations and adjusts dynamic write strategy parameters according to the calculated corrections. Thereafter, the write parameter adjustment controller 32 issues control signals 41 to the write pulse generator 42. Details of write parameter adjustment process are further described in the following flowcharts.

The mark write unit 40 comprises a write pulse generator 42 and a laser diode (LD) driver 45, being part of well-known write channel of optical disk recorder 100. The control signals 41 and modulated signals 43 are input in the write pulse generator 42, where the modulated signals 43 may be signals modulated from original encoded data, or particular pattern signals. The write pulse generator 42: generates relevant write pulses 44 according to the control signals 41 and modulated signals 43, and subsequently the LD driver 45 generates corresponding driving signals 46 to direct the OPU 10 to perform mark writes.

The write parameters storage unit 50 records write parameters whose write quality satisfying predetermined specification after adjustment learning. The write parameter storage unit 50 may be an EEPROM, a FLASH-ROM or similar.

Figure 3:
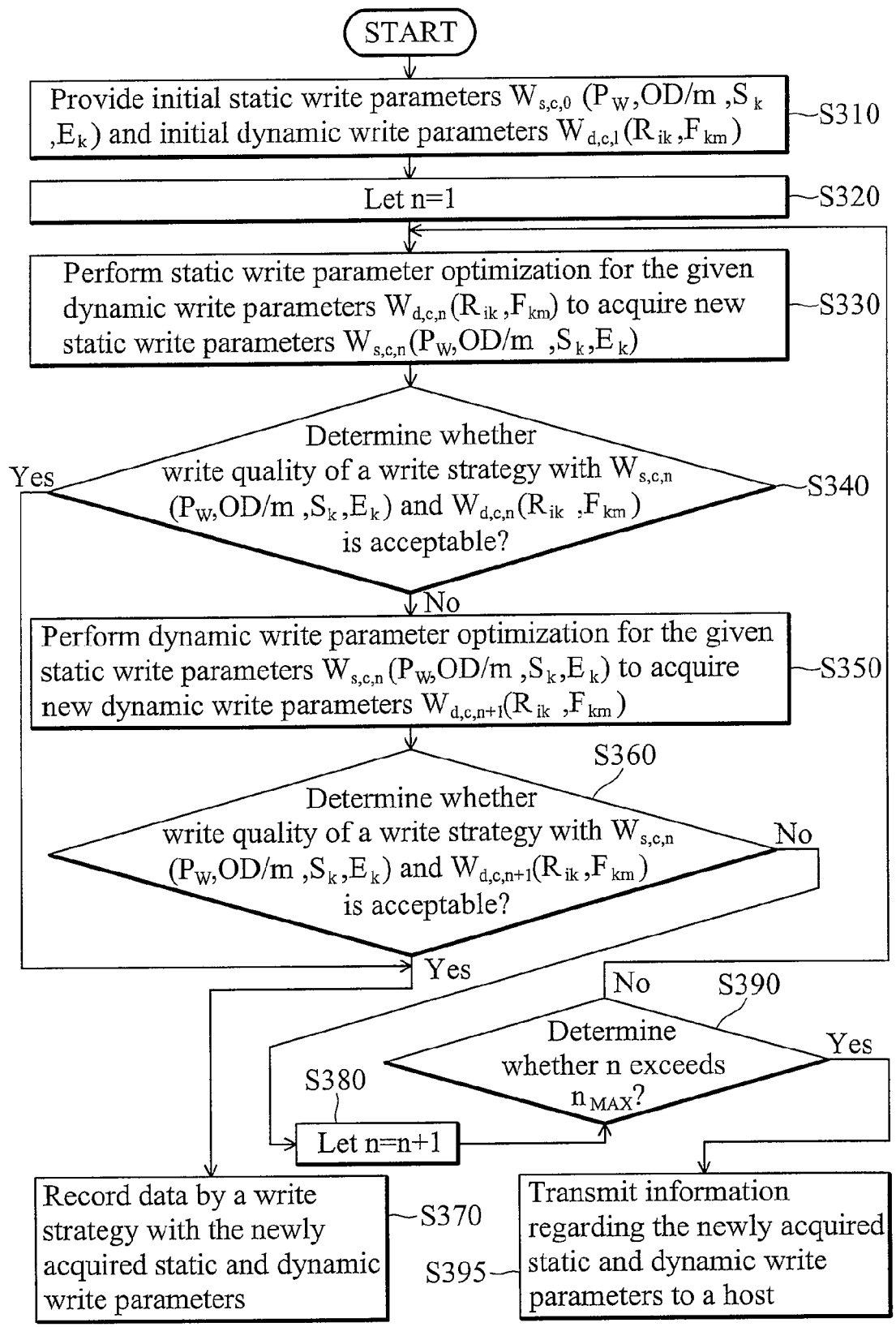
FIG. 3 is a flowchart illustrating an embodiment of a method for optimizing write parameters using two-stage adjustment.

FIG. 3 is a flowchart illustrating an embodiment of a method for optimizing write parameters using two-stage adjustment. These two recursive stages respectively optimize static and dynamic write strategy parameters. The first stage searches and finds out the optimal static write strategy parameters, and the second stage corrects dynamic write strategy parameters based on measured corrections. Note that, in one embodiment, a castle type laser output is used as a write strategy. The static write strategy parameters include $P_W$, OD, $S_k$, $E_k$, and represent as $WS_{s,c,n}$. The dynamic write strategy parameters include $R_{ik}, F_{km}$ and represent as $W_{d,c,n}$, n means the write strategy at the n time. In another embodiment, a multi-pulse type laser output is used as a write strategy. The static write strategy parameters include $P_W$, m, $S_k$, $E_k$, and represent as $W_{s,c,n}$. The dynamic write strategy parameters include $R_{ik}, F_{km}$ and represent as $W_{d,c,n}$, n means the write strategy at time n. In FIG. 3, in order to encompass these two embodiments, the $W_{s,c,n}(P_W, OD/m, S_k, E_k)$ is adapted.

Figure 4:
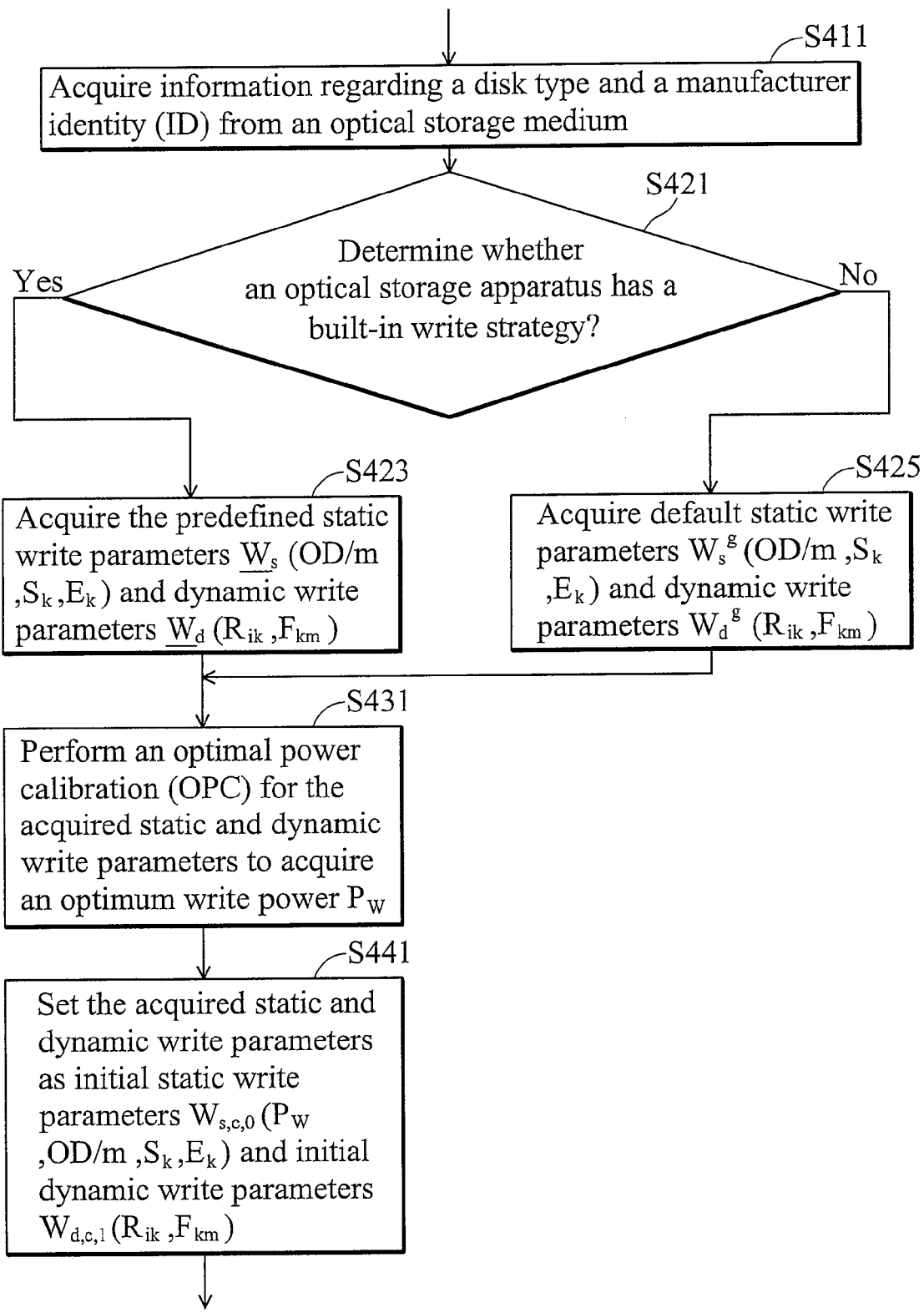
FIG. 4 is a flowchart illustrating an embodiment of a method for providing initial static and dynamic write strategy parameters.

In step S310, being a preparation procedure, initial static write strategy parameters $W_{s,c,0}(P_W, OD/m, S_k, E_k)$ and initial dynamic write strategy parameters $W_{d,c,0}(R_{ik}, F_{km})$ are provided. In step S320, let n=1 and $W_{d,c,1}(R_{ik}, F_{km}) = W_{d,c,0}(R_{ik}, F_{km})$ Details of step S310 are further described in FIG. 4. FIG. 4 is a flowchart illustrating an embodiment of a method for providing initial static and dynamic write strategy parameters performed in step S310 (FIG. 3). In step S411, a disk type and a manufacturer identity (ID) of the loaded disk 11 (FIG. 2) is inspected. Information regarding a disk type such as CD, DVD-R, DVD+R, DVD-RW, SACD, and a manufacturer ID is acquired on the optical disk 11. In step S421, it is determined whether the loaded optical disk 11 is supported, namely, it is determined whether the optical disk recorder 100 has a built-in write strategy corresponding to the optical disk 11. If the current medium is supported with a built-in write strategy, the process proceeds to step S423, otherwise, to step S425. In step S423, the built-in static write strategy parameters $\underline{W}_s(OD/m, S_k, E_k)$ and dynamic write strategy parameters $\underline{W}_d(R_{ik}, F_{km})$ associated with the acquired disk type and manufacturer ID are acquired. In step S425, default generic static write strategy parameters. $W_s^g(OD/m, S_k, E_k)$ and dynamic write strategy parameters $W_d^g(R_{ik}, F_{km})$ are acquired. The built-in static and dynamic write strategy parameters associated with the acquired disk type and manufacturer ID, as well as, the default genric static and dynamic write strategy parameters may be acquired from the storage unit 50 (FIG. 2). In step S431, a well-known optimal power calibration (OPC) for the acquired static and dynamic write strategy parameters is performed to acquire an optimum write power $P_w$. In step S441, the acquired static write strategy parameters $\underline{W}_s$(OD/m,$S_k$,$E_k$) and optimal write power, $P_w$, obtained through OPC are set as initial static write strategy parameters $W_{s,c,0}$($P_W$,OD/m,$S_k$,$E_k$). And acquired dynamic write strategy parameters are set as initial dynamic write strategy parameters $W_{d,c,1}$($R_{ik}$, $F_{km}$).

Referring to FIG. 3, step S330 is a procedure for optimizing static write strategy parameters. In step S330, static write strategy parameter optimization based on the given dynamic write strategy parameters $W_{d,c,n}$($R_{ik}$,$F_{km}$) is performed to acquire new static write strategy parameters $W_{s,c,n}$($P_W$, OD/m, $S_k$, $E_k$). Step S330 may adopt one of embodiments illustrated in FIGS. 5 to 9. Details of the embodiments for optimizing static write strategy parameters are described in the following paragraphs. Adjustment of all the static write strategy parameters may not necessary. The static write strategy parameter optimization may adjust one or more static write strategy parameters among $P_W$, OD/m, $S_k$ and $E_k$. At least one static write strategy parameter can be adjusted in step S330. Note that dynamic write strategy parameters applied in step S330 are newly adjusted ones.

Step S340 performs result verification for optimization static write strategy parameters from the first stage. Step S340 determines whether write quality of previous test writes with newly obtained static write strategy parameters and the given dynamic write strategy parameters satisfies predetermined target. If so, the process proceeds to step S370 for writing (or called recording) data, and otherwise, to step S350. Step 350 employs a dynamic write strategy parameter adjustment method illustrated in FIG. 10 or FIG. 11 to obtain a set of new dynamic write strategy parameters by correcting effect of heat interference. Specifically, in step S350, dynamic write strategy parameter optimization based on the given static write strategy parameters $W_{s,c,n}$($P_W$, OD/m,$S_k$,$E_k$) is performed to acquire new dynamic write strategy parameters $W_{d,c,n+1}$($R_{ik}$,$F_{km}$). Adjustment of all the dynamic write strategy parameters may not necessary. The dynamic write strategy parameter optimization may adjust one or more dynamic write strategy parameters among $R_{ik}$ and $F_{km}$. Note that static write strategy parameters applied in step S350 are newly adjusted ones.

Step S360 performs optimization result verification of dynamic write strategy parameters from the second stage. Step S360 determines whether write quality of previous test writes with newly obtained dynamic write strategy parameters and the given static write strategy parameters satisfies predetermined target. If so, the process proceeds to step S370 for writing (recording) data, and otherwise, to step S380. Specifically, in step S360, it is determined whether write quality of a write strategy with $W_{s,c,n}$($P_W$,OD/m,$S_k$,$E_k$) and $W_{d,c,n+1}$ ($R_{ik}$,$F_{km}$) is acceptable. In step. S370, data is recorded by a write strategy with the newly acquired static and dynamic write strategy parameters. In step S380, n is increased by one. In step S390, it is determined whether n exceeds a learning threshold $n_{MAX}$. If so, the process proceeds to step S395 to store currently obtained better static and dynamic write strategy parameters corresponding to currently measured better write quality, and to notify a host, thereby enabling the host to determine whether continues recording operation or showing a corresponding message. Otherwise, the process proceeds to step S330 to start the next-run of static and dynamic write parameter optimization.

Steps S340 and S360 may select the recent test write zone to perform result verification without triggering a new test write. In practice, after performing only single run of two-stage write parameter adjustment, acceptable write quality is acquired. As a result, the tuning threshold $n_{MAX}$ utilized in step. S390 may be set to one.

FIGS. 5 to 9 are flowcharts illustrating embodiments of methods for adjusting static write strategy parameters, performed in step S330 (as shown in FIG. 3). These embodiments employ one-dimensional search to obtain the best static write strategy parameter settings. The difference between these embodiments is total number of static write strategy parameters to be adjusted. In each one-dimensional search, static write strategy parameters other than a static write strategy parameter requiring optimizing are fixed.

Figure 5:
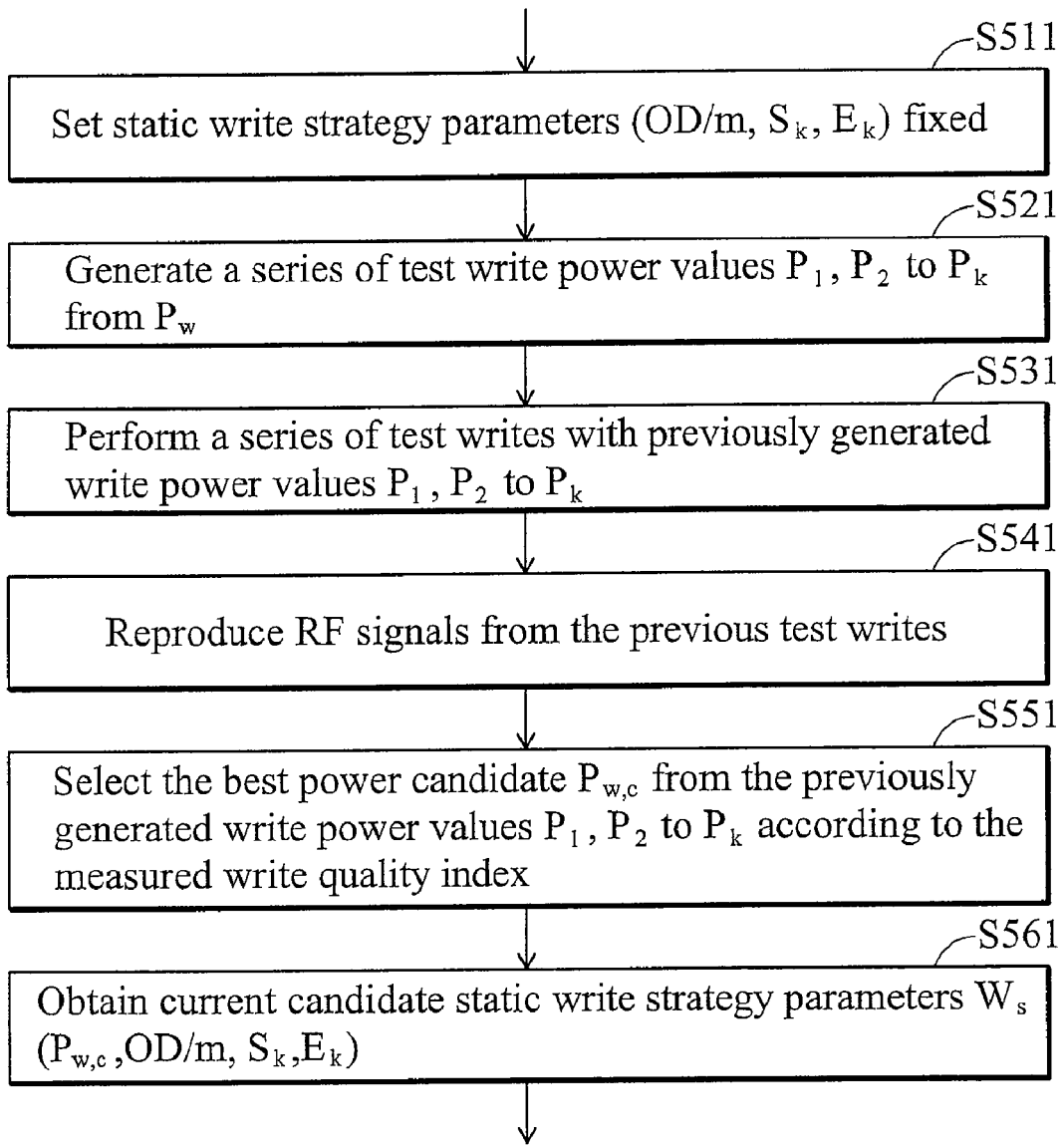
FIG. 5 is a flowchart illustrating an embodiment of a method for adjusting one static write strategy parameter.

FIG. 5 illustrates an embodiment of a method for adjusting laser power $P_W$. In step S511, static write strategy parameters (OD/m,$S_k$,$E_k$) are set to fixed. In step 521, a series of test write power values $P_1$, $P_2$ to $P_k$ are generated from $P_W$. For example, $P_i$ is $P_w$ increased or decreased by a particular value, where i range between 1 and k. In step S531, a series of test writes in a write strategy with previously generated write power values $P_1$, $P_2$ to $P_k$ and fixed static write strategy parameters (OD/m, $S_k$,$E_k$) is performed. In step S541, RF signals are reproduced from previous test writes to measure write quality of the reproduced signals. In step S551, the best power candidate $P_{w,c}$ is selected from the previous generated write power values $P_1$, $P_2$ to $P_k$ according to the measured write quality index. In step S561, current candidate static write strategy parameters $W_s$($P_{w,c}$,OD/m,$S_k$,$E_k$) are obtained. In step S551, it may determine one generated write power value corresponding to the best write quality index as the best candidate write power value, or one generated write power value falling in an acceptable range of write quality index. In steps S531 and S541, it may measure the write quality index after all test writes are completely performed, or may sequentially measure the write quality index after a portion of test writes are performed. The write quality index may be RF signal asymmetry 33s, data error rates 34s, jitter magnitudes 35s, mean length deviations for all mark combinations 36s, and mean edge shifts for all mark combinations 37s output from the write quality detection unit 31 (FIG. 3).

Figure 6:
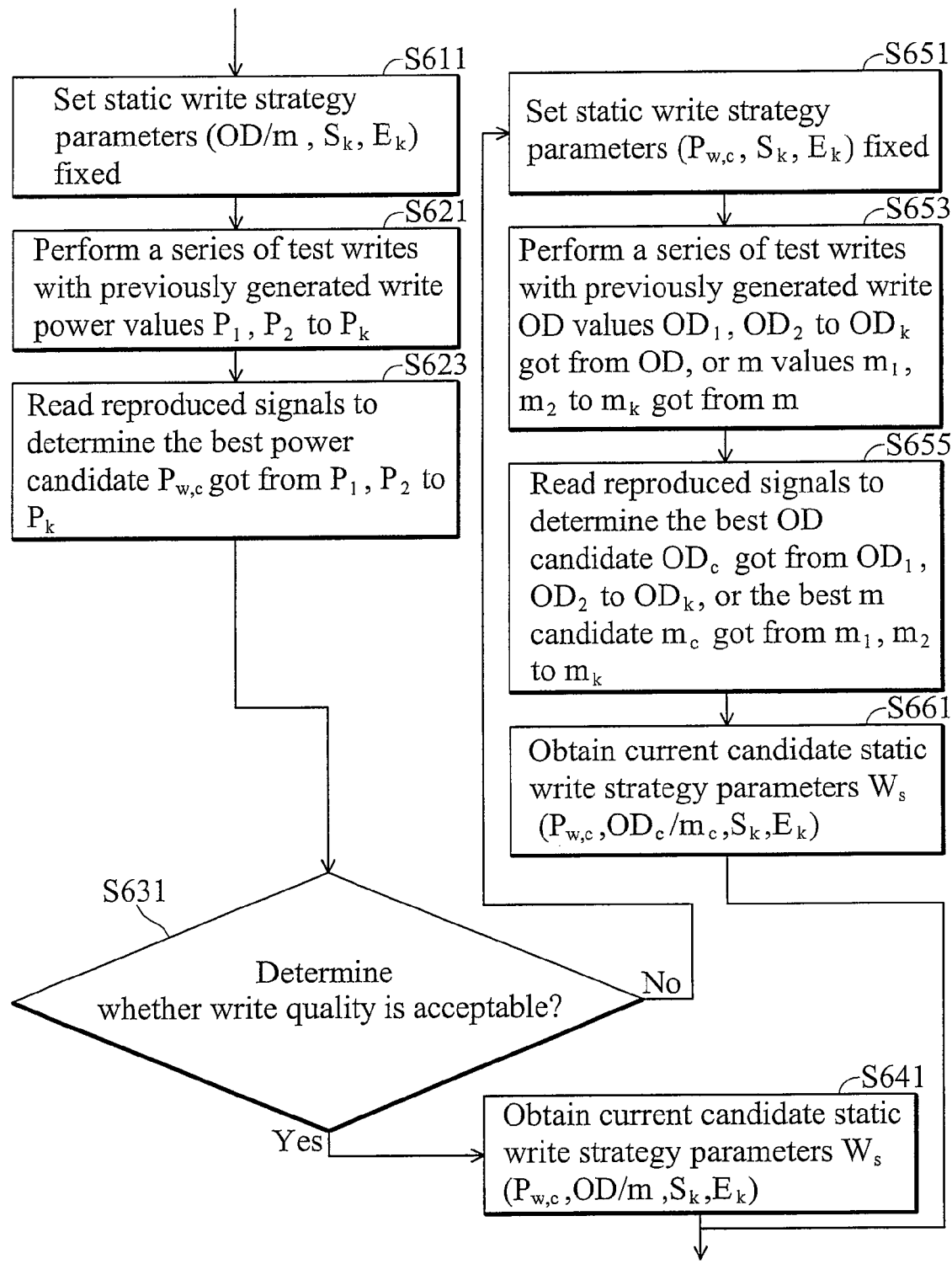
FIG. 6 is a flowchart illustrating an embodiment of a method for adjusting two static write strategy parameters.

FIG. 6 illustrates an embodiment of a method for adjusting $P_W$ and OD/m. The adjustment order of the second embodiment is $P_W$(S611 to S623) and OD/m (S651 to S655) in sequence. The adjustment details of $P_W$ and OD/m may refer to description of FIG. 5. Note that another adjustment order of the embodiment, OD/m and $P_W$ in sequence, is also available.

Figure 7A:
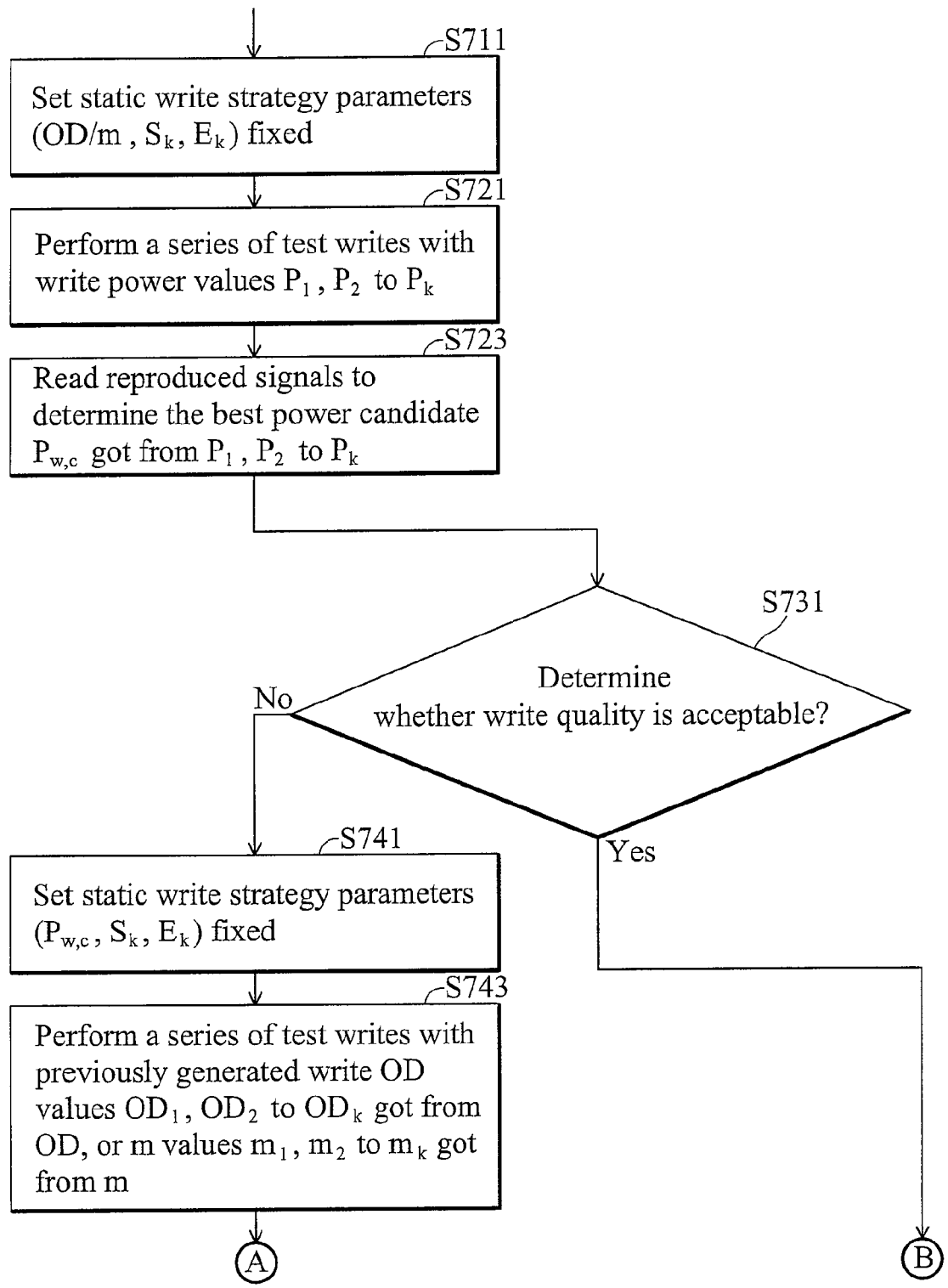
FIGS. 7a and 7b are flowcharts illustrating an embodiment of a method for adjusting three static write strategy parameters.
Figure 7B:
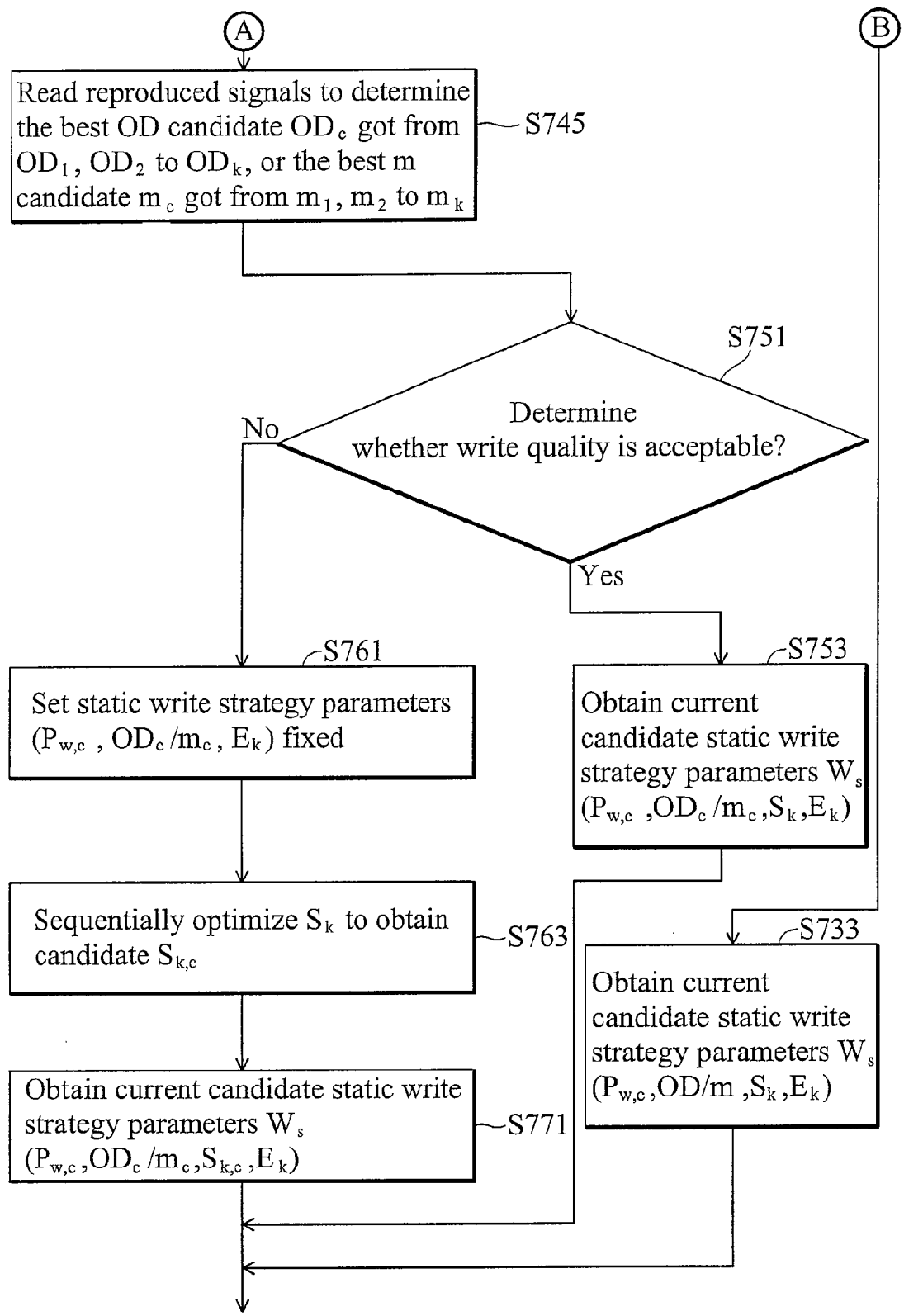

FIGS. 7a and 7b illustrate an embodiment of a method for adjusting $P_W$, OD/m and $S_k$. The adjustment details of $P_W$ and OD/m may refer to description of FIG. 6. The adjustment details of $S_k$ may refer to description of FIG. 9 in the following. Those skilled in the art will realize that the $S_k$ could be replaced by $E_k$. Adjusts $P_W$, OD/m and $E_k$ in sequence could be another embodiment of the present invention.

Figure 8A:
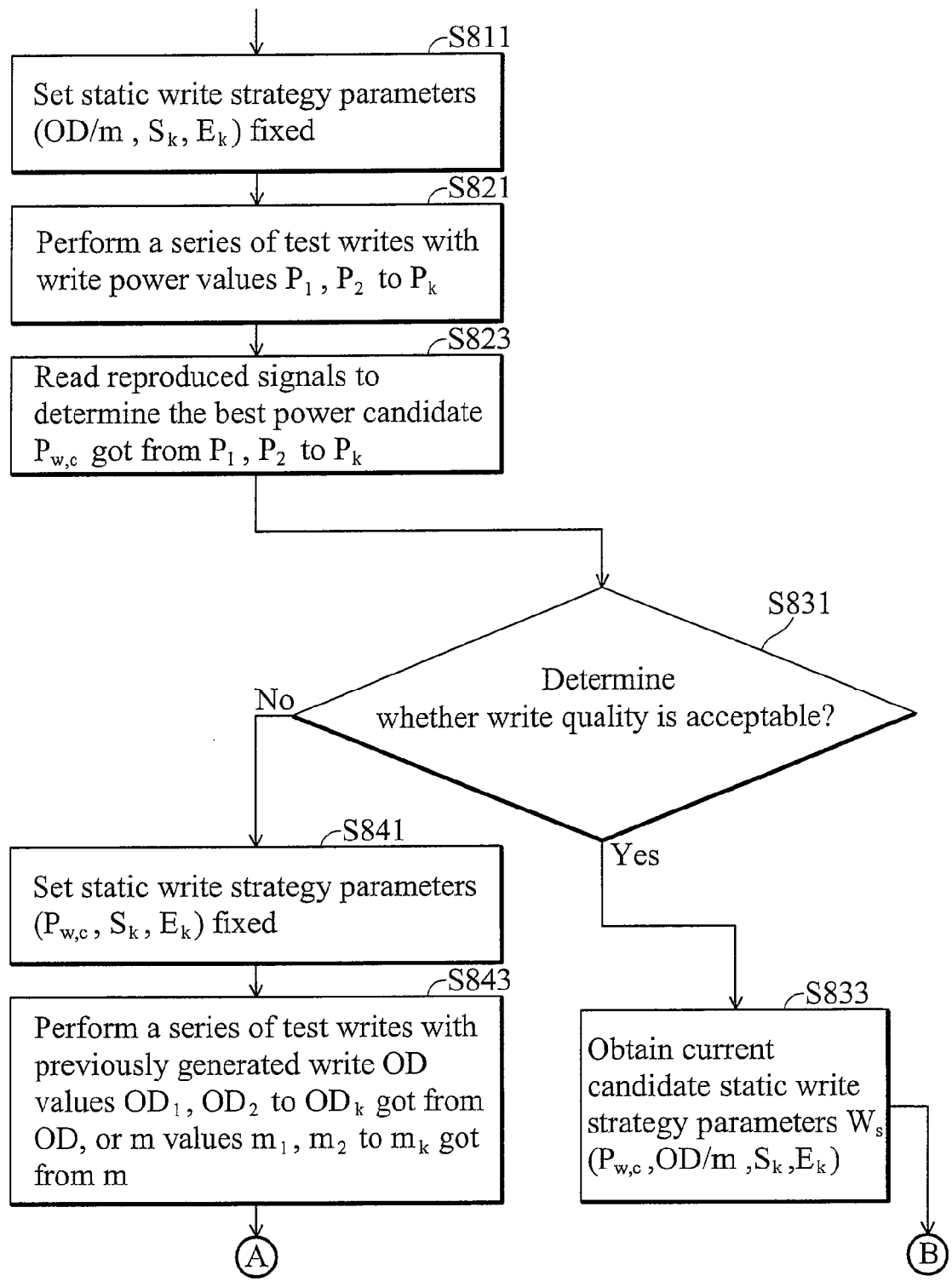
FIGS. 8a, 8b, and 8c are flowcharts illustrating an embodiment of a method for adjusting $S_k/E_k$.
Figure 8B:
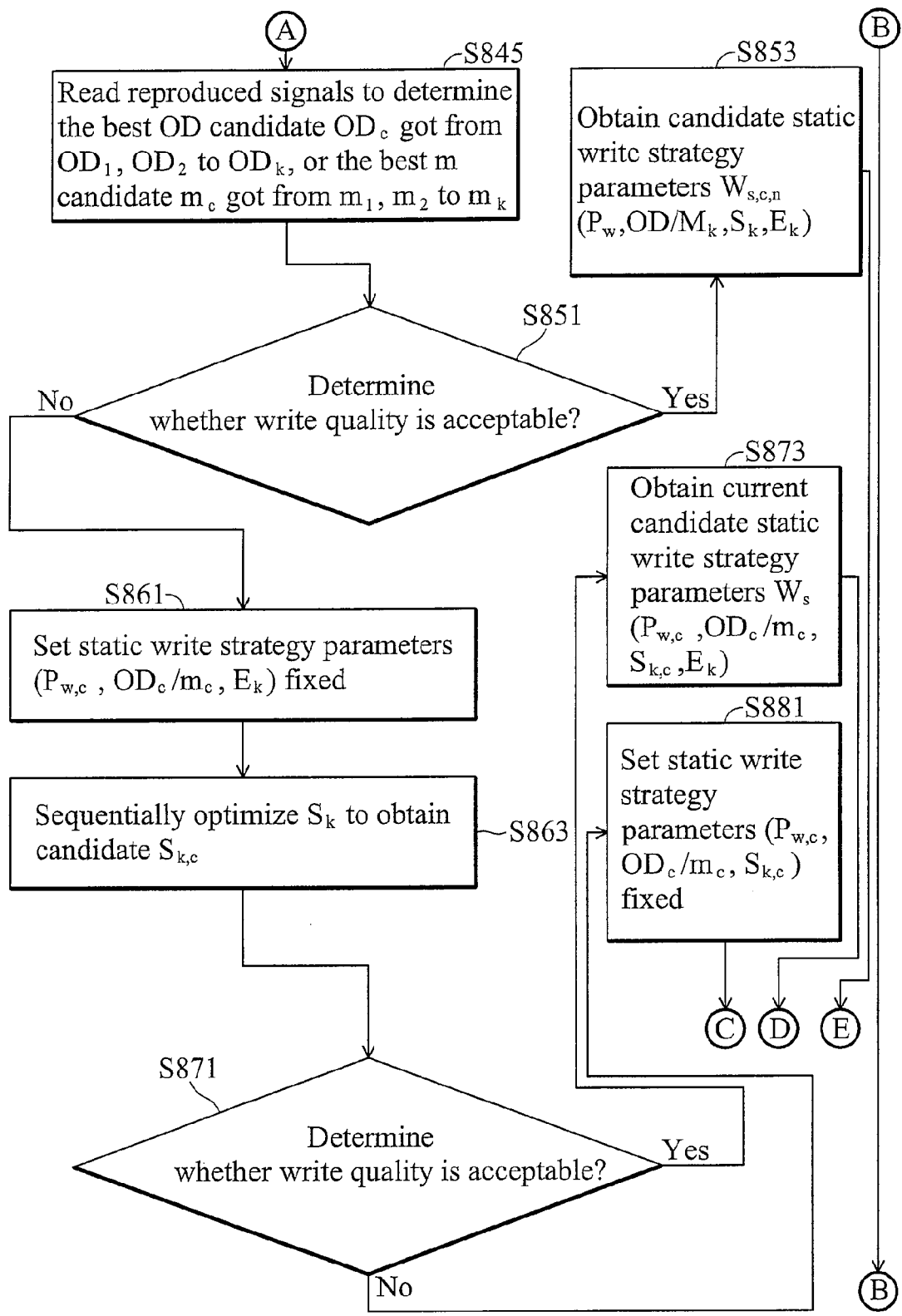
Figure 8C:
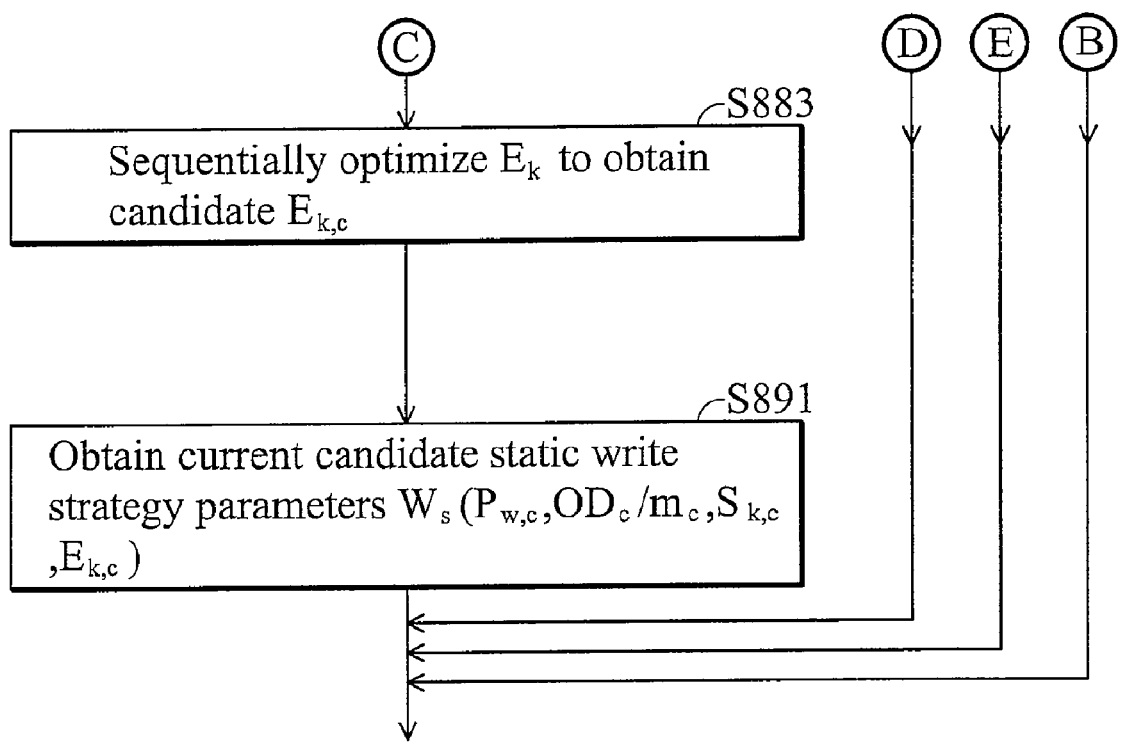

FIGS. 8a, 8b and 8c illustrate an embodiment of a method for adjusting $P_W$, OD/m, $S_k$ and $E_k$. The adjustment details of $P_W$, OD/m, $S_k$ and $E_k$ may refer to description of the prior three embodiments as shown in FIGS. 5, 6, 7a and 7b. The adjustment details of $S_k$ and $E_k$ may refer to description of FIG. 9 in the following.

Figure 9:
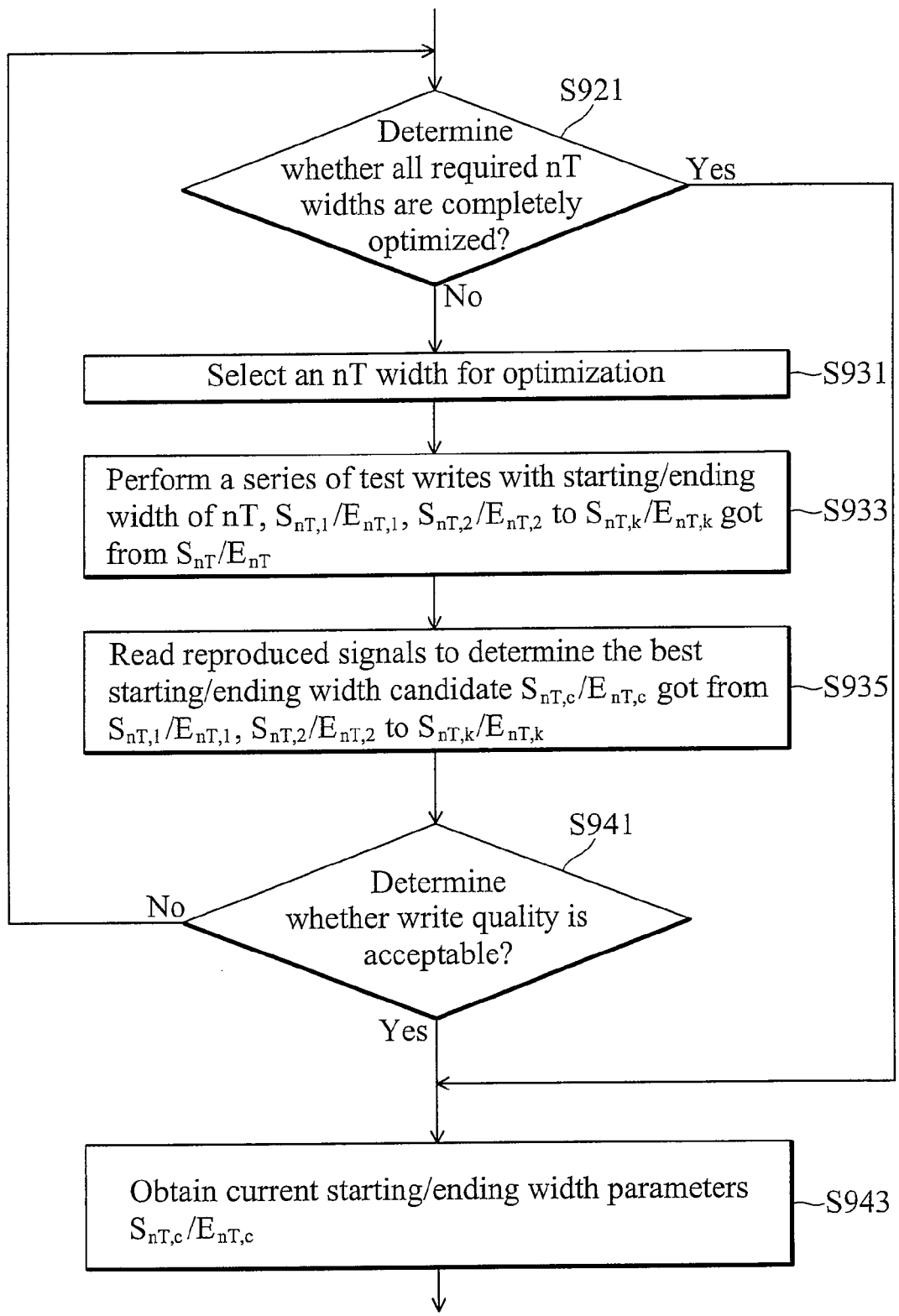
FIG. 9 is a flowchart illustrating an embodiment of a method for adjusting dynamic write strategy parameters.

FIG. 9 is a flowchart illustrating an embodiment of a method for adjusting $S_k$/$E_k$, may be performed in relevant steps of the described processes in different embodiments (as shown in FIG. 5, 6, 7a, 7b, 8a, 8b or 8c). In step S921, it is determined whether all required nT widths are completely optimized, where nT is one of 3T to 11T. If so, the process proceeds to step S943, otherwise, to step S931. In step S931, an nT width is selected for optimization. In step S933, a series of test writes with several starting/ending width of nT, $S_{nT,1}$/

$E_{nT,1}$, $S_{nT,2}/E_{nT,2}$ to $S_{nT,k}/E_{nT,k}$ got from $S_{nT}/E_{nT}$ are performed. In step S935, reproduced signals are read to determine the best starting/ending width candidate $S_{nT,c}/E_{nT,c}$ from $S_{nT,1}/E_{nT,1}$, $S_{nT,2}/E_{nT,2}$ to $S_{nT,k}/E_{nT,k}$. In step S941, it is determined whether write quality is acceptable. If so, the process proceeds to step S943, otherwise, to step S921. In step S943, current candidate starting/ending width parameters $S_{k,c}/E_{k,c}$ are obtained.

Figure 10:
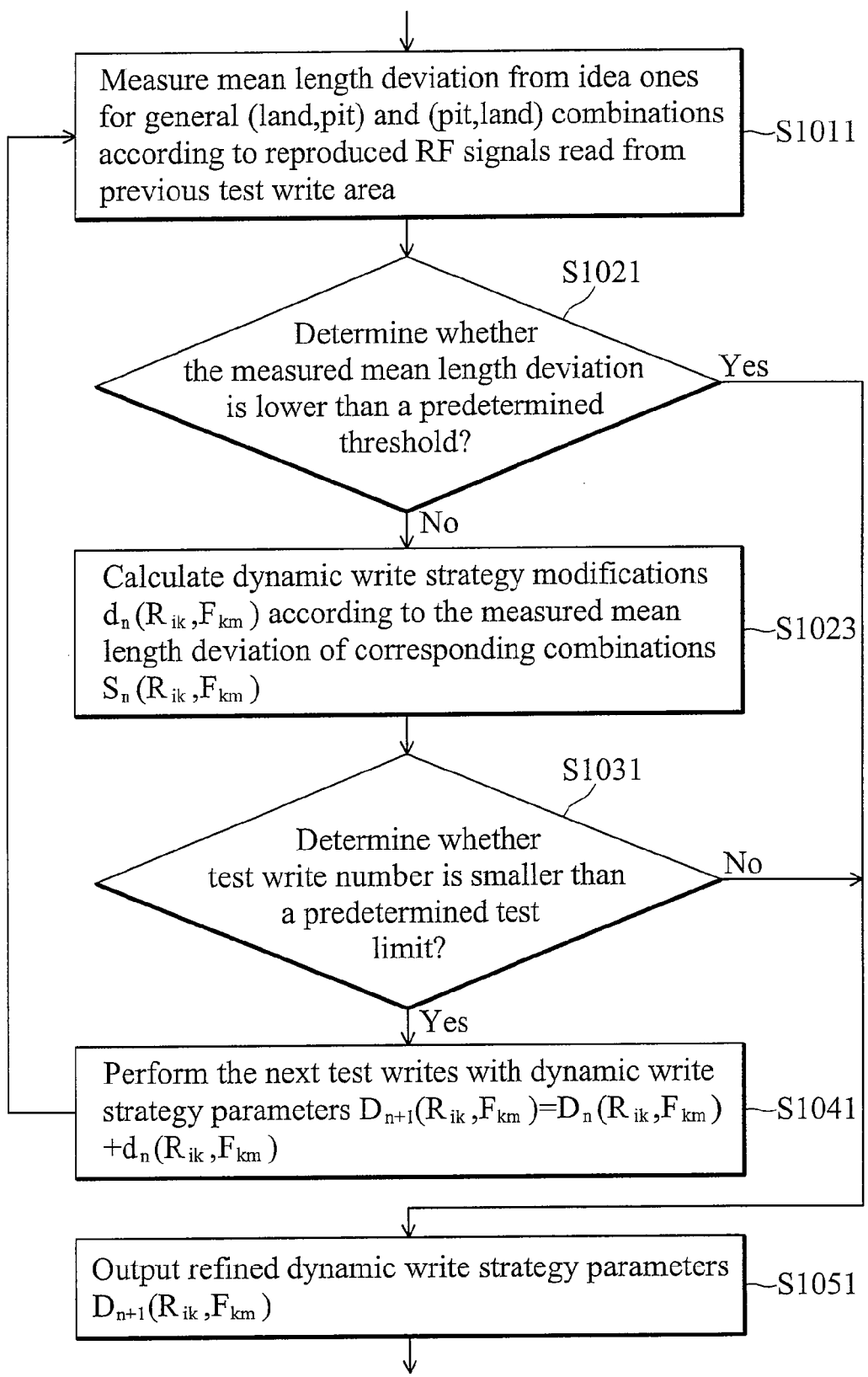
FIG. 10 is a flowchart illustrating an embodiment of a method for adjusting dynamic write strategy parameters.

FIG. 10 illustrates an embodiment of a method for adjusting dynamic write strategy parameters. In step 1011, mean length deviation from ideas ones for general (land,pit) and (pit,land) combinations is measured according to reproduced RF signals read from previous test write area. In step S1021, it is determined whether the measured mean length deviation is lower than a predetermined threshold. If so (i.e. the measured mean length deviation is acceptable), the process proceeds to step S1051, and otherwise, to step S1023. In step S1051, refined dynamic write strategy parameters $D_{n+1}(R_{ik}, F_{km})$ are output. In step S1023, dynamic write strategy modifications $d_n(R_{ik},F_{km})$ are calculated according to the measured mean length deviation of corresponding combinations $S_n(R_{ik}, F_{km})$. For example, corrections for any combinations of $(R_{ik}, F_{km})$ can be determined by the following equation:

$$d(R_{ik},F_{km})=K(R_{ik},F_{km})*S(R_{ik},F_{km}),$$

where $d(R_{ik},F_{km})$ represents a correction for a particular combination of $(R_{ik}, F_{km})$, $S(R_{ik}, F_{km})$ represents an average of the differences between a corresponding idea pit length and actual lengths of reproduced signals of relevant test writes for a particular combination of $(R_{ik}, F_{km})$, and $S(R_{ik},F_{km})$ represents a constant of percent for a particular combination of $(R_{ik},F_{km})$. Note that adjustment magnitudes for all combinations of $d(R_{ik},F_{km})$ are determined in each run, where i, k and m respectively represent one of 3 to 11, preferably 3 to 6. In step S1031, it is determined whether test write number (i.e. runs) is smaller than a predetermined test limit. If so, the process proceeds to step S1051, and otherwise, to step S1041. Typically, the predetermined test limit equals one, namely, the dynamic write strategy parameters are often tuned to an acceptable level at one time. In step S1041, the next test writes with dynamic write strategy parameters $D_{n+1}(R_{ik},F_{km})=D_n(R_{ik},F_{km})+d_n(R_{ik},F_{km})$ are performed.

Figure 11:
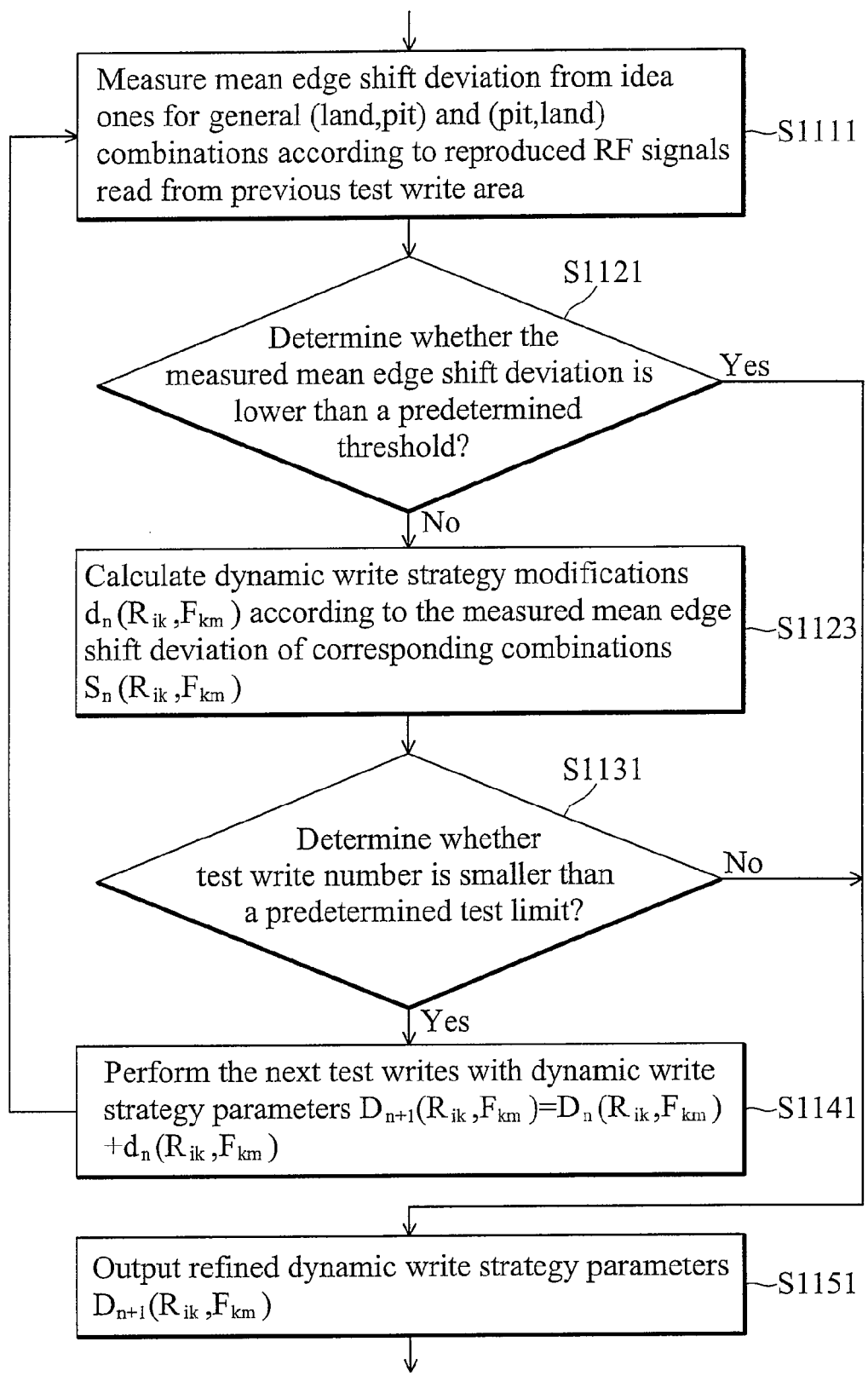
FIG. 11 is a flowchart illustrating another embodiment of a method for adjusting dynamic write strategy parameters.

FIG. 11 illustrates another embodiment of a method for adjusting dynamic write strategy parameters. The differences from the embodiment illustrated in FIG. 10 are the followings. In step S1111, mean edge shift deviation (other than mean length deviation as shown in step S1011 of FIG. 10) from idea ones for general (land,pit) and (pit,land) combinations is measured according to reproduced RF signals read from previous test write area. In step S1121, it is determined whether the measured mean edge shift deviation (other than mean length deviation as shown in step S1021 of FIG. 10) is lower than a predetermined threshold. In step S1123, dynamic write strategy modifications $d_n(R_{ik},F_{km})$ are calculated according to the measured mean edge shift deviation (other than mean length deviation as shown in step S1023 of FIG. 10) of corresponding combinations $S_n(R_{ik},F_{km})$.

Certain terms are used throughout the description and claims to refer to particular system components. As one skilled in the art will appreciate, consumer electronic equipment manufacturers may refer to a component by different names. This document does not intend to distinguish between components that differ in name but not function.

Although the invention has been described in terms of preferred embodiment, it is not limited thereto. Those skilled in this technology can make various alterations and modifications without departing from the scope and spirit of the invention. Therefore, the scope of the invention shall be defined and protected by the following claims and their equivalents.

What is claimed is:

1. A method of optimizing write parameters for recoding a plurality of marks and lands on to an optical disk, comprising:
    performing a static write strategy parameters optimization procedure for adjusting at least one static write strategy parameter of a write strategy; and
    performing a dynamic write strategy parameters optimization procedure for adjusting at least one dynamic write strategy parameter of the write strategy;
    wherein the static write strategy parameters correspond to each single mark and the dynamic write strategy parameters correspond to each mark and land combination.

2. The method of claim 1 wherein the dynamic write strategy parameters optimization procedure is performed when a write quality resulting from the write strategy adjusted by the static write strategy parameters optimization procedure is not acceptable.

3. The method of claim 1 wherein the dynamic write strategy parameter optimization procedure is repeatedly performed until a write quality resulting from the write strategy adjusted by the static and prior dynamic of write strategy parameters optimization procedures is acceptable or a number representing adjustment runs of the dynamic write strategy parameters optimization procedures exceeds a predetermined threshold.

4. The method of claim 1 wherein the write strategy is a castle-type laser output, the static write strategy parameters indicate a laser power level, an over drive (OD) representing overdrive power percentage, an OD power width of a front end for a nT mark, or an OD power width of a back end for a nT mark, and the dynamic write strategy parameters corresponding to a (land,pit) and (pit,land) combination indicate a position after an ideal prior land for a distance, or a position prior to an ideal subsequent land for a distance.

5. The method of claim 1 wherein the write strategy is a multi-pulse laser output, the static write strategy parameters indicate a power level, a percentage denoting width of one middle pulse into base clock, an OD power width of a front end for a nT mark, or an OD power width of a back end for a nT mark, and the dynamic write strategy parameters corresponding to a (land,pit) and (pit,land) combination indicate a position after an ideal prior land for a distance, or a position prior to an ideal subsequent land for a distance.

6. The method of claim 1 wherein the write strategy indicates a castle-type laser output or a multi-pulse laser output, the static write strategy parameters indicate a laser power level Pw, an over drive (OD) representing overdrive power percentage, an OD power width of a front end for a kT mark Sk, an OD power width of a back end for a kT mark Ek, or a percentage m denoting width of one middle pulse into base clock, and the static write strategy parameters optimization procedure further comprises:
    determining a first static write strategy parameter to be adjusted from Pw, OD, Sk, Ek and m;
    generating a series of first values for the first static write strategy parameter based on the current setting of the first static write strategy parameter;
    performing a series of writes of the write strategy, wherein only the first static write strategy parameter is changed according to the previously generated series of first values while the remaining write parameters are unchanged; and determining the best setting for the first static write parameter according to the reproduction results of RF or sliced signals by reading the previous sample recordings.

7. The method of claim 6 wherein the static write strategy parameters optimization procedure further comprises:

determining a second static write strategy parameter to be adjusted from the unadjusted static write strategy parameters when a result of write quality of the write strategy comprising the adjusted first static write strategy parameter is unacceptable;

generating a series of second values for the second static write strategy parameter based on the current setting of the second static write strategy parameter;

performing a series of writes of the write strategy, wherein only the second static write strategy parameter is changed according to the previously generated series of second values while the remaining write parameters are unchanged; and determining the best setting for the second static write parameter according to the reproduction results of RF or sliced signals by reading the previous sample recordings.

8. The method of claim 7 wherein the static write strategy parameters optimization procedure further comprises:

determining a third static write strategy parameter to be adjusted from the unadjusted static write strategy parameters when a result of write quality of the write strategy comprising the adjusted first and second static write strategy parameters is unacceptable;

generating a series of third values for the third static write strategy parameter based on the current setting of the third static write strategy parameter;

performing a series of writes of the write strategy, wherein only the third static write strategy parameter is changed according to the previously generated series of third values while the remaining write parameters are unchanged; and determining the best setting for the third static write parameter according to the reproduction results of RF or sliced signals by reading the previous sample recordings.

9. The method of claim 8 wherein the static write strategy parameters optimization procedure further comprises:

determining a fourth static write strategy parameter to be adjusted from the unadjusted static write strategy parameters when a result of write quality of the write strategy comprising the adjusted first, second and third static write strategy parameters is unacceptable;

generating a series of fourth values for the fourth static write strategy parameter based on the current setting of the fourth static write strategy parameter;

performing a series of writes of the write strategy, wherein only the fourth static write strategy parameter is changed according to the previously generated series of fourth values while the remaining write parameters are unchanged; and determining the best setting for the fourth static write parameter according to the reproduction results of RF or sliced signals by reading the previous sample recordings.

10. The method of claim 1 wherein the write strategy indicates a castle-type laser output or a multi-pulse laser output, the dynamic write strategy parameters corresponding to a plurality of (land,pit) and (pit,land) combinations indicate positions after ideal prior lands for a distance, or positions prior to ideal subsequent lands for a distance, and the dynamic write strategy parameters optimization procedure further comprises:

performing a series of writes of the write strategy with the latest updated static write strategy parameters and the current settings of the dynamic write strategy parameters;

reading the reproduced sliced signals from the previous sample recordings;

generating a measure representing the differences between ideal pits/lands and actual recorded pits/lands according to the reproduced signals of sample recordings; and generating a plurality of new settings of the dynamic write strategy parameters according to the generated measure.

11. A system for optimizing write parameters using two-stage adjustment, comprising:

a write parameter adjustment controller coupled to a signal read unit and a mark write unit, performing a static write strategy parameters optimization procedure for adjusting at least one static write strategy parameter of a write strategy, and performing a dynamic write strategy parameters optimization procedure for adjusting at least one dynamic write strategy parameter of the write strategy, wherein static write strategy parameters correspond to each single mark and the dynamic write strategy parameters correspond to each mark and land combination.

12. The system of claim 11 wherein the write parameter adjustment controller performs the dynamic write strategy parameters optimization procedure when a write quality resulting from the write strategy adjusted by the static write strategy parameters optimization procedure is not acceptable.

13. The system of claim 12 wherein the result indicates asymmetry of RF signals detected by an asymmetry detector therein, error rates of sliced signals detected by an error rate detector therein or jitter of sliced signals detected by a jitter detector therein.

14. The system of claim 11 wherein the write parameter adjustment controller repeatedly performs the dynamic write strategy parameters optimization procedure until a write quality resulting from the write strategy adjusted by the static and prior dynamic write strategy parameters optimization procedures is acceptable or a number representing adjustment runs of the dynamic write strategy parameters optimization procedures exceeds a predetermined threshold.

15. The system of claim 14 wherein the result indicates pits/lands length deviations detected by an EFM length deviation detector therein or pits/lands edge deviations detected by the EFM edge deviation detector therein.

16. The system of claim 11 wherein the write strategy is a castle-type laser output, the static write strategy parameters indicate a laser power level, an over drive (OD) representing overdrive power percentage, an OD power width of a front end for a nT mark, or an OD power width of a back end for a nT mark, and the dynamic write strategy parameters corresponding to a (land,pit) and (pit,land) combination indicate a position after an ideal prior land for a distance, or a position prior to an ideal subsequent land for a distance.

17. The system of claim 11 wherein the write strategy is a multi-pulse laser output, the static write strategy parameters indicate a power level, a percentage denoting width of one middle pulse into base clock, an OD power width of a front end for a nT mark, or an OD power width of a back end for a nT mark, and the dynamic write strategy parameters corresponding to a (land,pit) and (pit,land) combination indicate a position after an ideal prior land for a distance, or a position prior to an ideal subsequent land for a distance.

18. The system of claim 11 wherein the write strategy indicates a castle-type laser output or a multi-pulse laser output, the static write strategy parameters indicate a laser power level Pw, an over drive (OD) representing overdrive power percentage, an OD power width of a front end for a kT mark Sk, an OD power width of a back end for a kT mark Ek, or a percentage m denoting width of one middle pulse into base clock, and the static write strategy parameters optimization procedure further comprises:

determining a first static write strategy parameter to be adjusted from Pw, OD, Sk, Ek and m;

generating a series of first values for the first static write strategy parameter based on the current setting of the first static write strategy parameter;

performing a series of writes of the write strategy, wherein only the first static write strategy parameter is changed according to the previously generated series of first values while the remaining write parameters are unchanged; and determining the best setting for the first static write parameter according to a plurality of reproduction results of RF or sliced signals by reading previous sample recordings.

19. The system of claim 18 wherein the static write strategy parameters optimization procedure further comprises:

determining a second static write strategy parameter to be adjusted from the unadjusted static write strategy parameters when a result of write quality of the write strategy comprising the adjusted first static write strategy parameter is unacceptable;

generating a series of second values for the second static write strategy parameter based on the current setting of the second static write strategy parameter;

performing a series of writes of the write strategy, wherein only the second static write strategy parameter is changed according to the previously generated series of second values while the remaining write parameters are unchanged; and determining the best setting for the second static write parameter according to the reproduction results of RF or sliced signals by reading previous sample recordings.

20. The system of claim 19 wherein the static write strategy parameters optimization procedure further comprises:

determining a third static write strategy parameter to be adjusted from the unadjusted static write strategy parameters when a result of write quality of the write strategy comprising the adjusted first and second static write strategy parameters is unacceptable;

generating a series of third values for the third static write strategy parameter based on the current setting of the third static write strategy parameter; performing a series of writes of the write strategy, wherein only the third static write strategy parameter is changed according to the previously generated series of third values while the remaining write parameters are unchanged; and determining the best setting for the third static write parameter according to the reproduction results of RF or sliced signals by reading the previous sample recordings.

21. The system of claim 20 wherein the static write strategy parameters optimization procedure further comprises:

determining a fourth static write strategy parameter to be adjusted from the unadjusted static write strategy parameters when a result of write quality of the write strategy comprising the adjusted first, second and third static write strategy parameters is unacceptable;

generating a series of fourth values for the fourth static write strategy parameter based on the current setting of the fourth static write strategy parameter;

performing a series of writes of the write strategy, wherein only the fourth static write strategy parameter is changed according to the previously generated series of fourth values while the remaining write parameters are unchanged; and determining the best setting for the fourth static write parameter according to the reproduction results of RF or sliced signals by reading the previous sample recordings.

22. The system of claim 11 wherein the write strategy indicates a castle-type laser output or a multi-pulse laser output, the dynamic write strategy parameters corresponding to a plurality of (land,pit) and (pit,land) combinations indicate positions after ideal prior lands for a distance, or positions prior to ideal subsequent lands for a distance, and dynamic write strategy parameters optimization procedure further comprises:

performing a series of writes of the write strategy with the latest updated static write strategy parameters and the current settings of the dynamic write strategy parameters;

reading the reproduced sliced signals from the previous sample recordings;

generating a measure representing the differences between ideal pits/lands and actual recorded pits/lands according to the reproduced signals of sample recordings; and generating a plurality of new settings of the dynamic write strategy parameters according to the generated measure.

* * * * *